United States Patent [19]

Menown et al.

[11] Patent Number: 4,498,181
[45] Date of Patent: Feb. 5, 1985

[54] LASER ARRANGEMENTS

[75] Inventors: Hugh Menown, Writtle; Barry P. Newton, Boreham; Christopher V. Neale, Hatfield Peverel, all of England

[73] Assignee: English Electric Valve Company Limited, Chelmsford, England

[21] Appl. No.: 534,399

[22] Filed: Sep. 23, 1983

Related U.S. Application Data

[63] Continuation of Ser. No. 18,278, Mar. 7, 1979.

[30] Foreign Application Priority Data

Mar. 9, 1978 [GB] United Kingdom ............... 789306

[51] Int. Cl.$^3$ .............................................. H01S 3/00
[52] U.S. Cl. ........................................ 372/38; 372/76; 315/197; 315/350
[58] Field of Search .............. 372/81, 38, 88, 87, 372/55, 76; 313/197, 204; 315/350

[56] References Cited

U.S. PATENT DOCUMENTS

| | | | |
|---|---|---|---|
| 3,351,870 | 11/1967 | Goldsmith et al. | 331/94.5 PE |
| 3,633,127 | 1/1972 | Caristi | 331/94.5 PE |
| 3,772,613 | 11/1973 | Smith | 331/94.5 PE |
| 3,898,518 | 8/1975 | Menown et al. | 313/197 |
| 4,039,971 | 8/1977 | Wang et al. | 331/94.5 PE |
| 4,053,853 | 10/1977 | Collins, Jr. | 331/94.5 PE |
| 4,081,719 | 3/1978 | Molyneux-Berry | 315/350 |

OTHER PUBLICATIONS

Turnguist et al., "Grounded Thyratrons", origin unknown, supplied by applicant.

Primary Examiner—William L. Sikes
Assistant Examiner—Léon Scott, Jr.
Attorney, Agent, or Firm—Diller, Ramik & Wight

[57] ABSTRACT

The invention provides a laser arrangement including in its discharge circuit a switching thyratron which is capable of conduction normally in one direction and protectively in the reverse direction. The thyratron has an anode formed as a hollow body which is adapted to retain plasma generated during a pulse of forward conduction so that the anode is provided to act as a cathode permitting protective reversal of the thyratron when this is subject to reversal of voltage.

6 Claims, 1 Drawing Figure

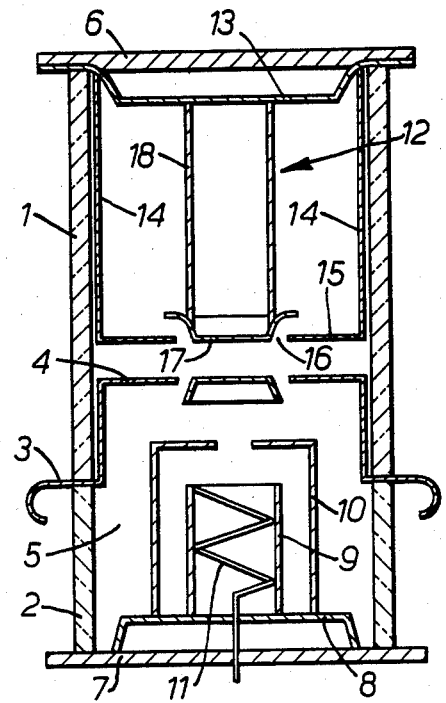

LASER ARRANGEMENTS

This application is a continuation of application Ser. No. 18,278, filed Mar. 7, 1979.

This invention relates to laser arrangements.

The use of thyratrons in a laser discharge circuit has been proposed by, for example, D. Turnquist, S. Merz and R. Plante in a paper entitled "Grounded Grid Thyratrons" EG&G, Inc. Salem, Mass. 01970.

A difficulty which arises, however, and to which Turnquist, Merz and Plante refer, is that with a conventional thyratron, it is likely to suffer severe damage due to the sputtering of anode material and the formation of arc spots on the anode surface if subjected to a reversal of voltage such as those which occur in laser discharge circuits.

One object of the present invention is to provide an improved laser arrangement in which the above difficulty is reduced.

According to this invention a laser arrangement includes in its discharge circuit a switching thyratron which is adapted or arranged to be capable of conduction normally in one direction and protectively in the reverse direction if said thyratron is subjected to a reversal of voltage.

Said switching thyratron may be of the double-ended type as known per se, for example, from the specification of our U.K. Pat. No. 1,334,527. However, it is preferred to use a special construction of thyratron and according to a feature of this invention said switching thyratron has an anode formed as a hollow body adapted to retain plasma generated during a pulse of forward conduction whereby said anode is provided to act as a cathode permitting protective reversal of said thyratron.

It will be noted that a thyratron utilised in accordance with the feature of the present invention does not rely, as a so called double-ended thyratron relies, upon the provision of an anode which incorporates a heater and cathode material so as to be operable as a cathode or an anode. In the thyratron utilised according to the feature of the present invention it is the plasma, retained within the hollow body of the anode, which enable the anode to act as a cathode and afford protective reverse conduction if the voltage applied thereto reverses.

Preferably said anode of said thyratron comprises a cylinder which is closed at both ends except for an aperture in an end closure towards said cathode which aperture is partially obstructed by a flanged plate, whereby the passage from without to within the interior of said hollow body is re-entrant.

Preferably said aperture is round and said plate is a co-axial circular flanged disc.

The invention is illustrated in and further described with reference to the accompanying drawing which is a section through one relatively simple thyratron utilised in accordance with the feature of the present invention as a switching thyratron in the discharge circuit of a laser.

Referring to the drawing, the thyratron consists of an envelope formed of two ceramic cylinders 1 and 2 separated by an annular flange 3, which forms the connection for a control grid electrode 4. The interior 5 of the envelope is filled with hydrogen or one of the hydrogen isotopes. The ends of the envelope are closed by cover plates 6 and 7, the cover plates 7 carries a conductive platform 8 on which is mounted a cylindrical cathode 9, surrounded by a heat shield 10. The cathode 9 is heated by a cathode heater 11.

At the end of the envelope opposite the cathode 9 is an anode 12. The anode 12 is in the form of a hollow box formed by a conductive platform 13 mounted on cover plate 6, a conductive cylindrical wall 14 and a conductive end closure 15 which faces the grid 4. The end closure 15 has a central round aperture 16 which is partially closed by a circular flanged disc 17 carried from the platform 13 by a cylinder 18.

The construction of the anode 12 is such that plasma generated during a pulse of forward conduction initiated by a trigger pulse applied to the control grid 4 via the flange 3 is retained within the hollow interior of the anode 12 after forward conduction ceases. The result of this is that if the thyratron is subjected to a reversal of potential which might otherwise result in damage due to arcing, the anode 12 is enabled to act as a cathode permitting reversal of the thyratron. Thus sputtering of anode material and the formation of arc spots on the anode surface tends to be avoided since if the potential applied to the thyratron reverses the thyratron merely conducts in a reverse direction.

It will be noted that this reverse conduction of the thyratron is due entirely to the plasma trap within the hollow anode which is not constructed with a heater and cathode material whereby normally to act as a cathode or an anode as in the case of a so called double ended thyratron.

The thyratron is connected as known per se to switch energy from a capacitive source (not shown) into a pulsed laser (also not shown).

We claim:

1. A laser arrangement including in its discharge circuit a switching thyratron having cathode means for preparing the thyratron to conduct forwardly, control grid means for triggering forward conduction of the thyratron and anode means for trapping and retaining plasma generated during a pulse of forward conduction from said anode means to said cathode means so that the switching thyratron is prepared to conduct protectively in the reverse direction when forward conduction ceases if said thyratron is subjected to a reversal of voltage between said cathode means and said anode means, said anode means being devoid of a heater and cathode material whereby conduction in said reverse direction is prepared solely by the plasma trapped and retained by said anode means.

2. A laser arrangement as claimed in claim 1 and wherein said anode means is formed as a hollow body to trap and retain plasma generated during a pulse of forward conduction whereby said anode acts as a cathode permitting protective reversal of conduction by said thyratron.

3. A laser arrangement as claimed in claim 2 and wherein said hallow body comprises a cylinder which is closed at both ends except for an aperture in an end closure towards said cathode means wich aperture is partially obstructed by a flanged plate.

4. A laser arrangement as claimed in claim 3 and wherein said aperture is round and said plate is a co-axial circular flanged disc.

5. A laser arrangement having a discharge circuit which is subjected to a voltage reversal, said discharge circuit comprising a gaseous switching thyratron having an anode, a heated cathode and a control grid, said anode being devoid of a heater and cathode material and said anode and cathode being connected in said discharge circuit to effect only a forward conduction of the thyratron to discharge the laser in response to a trigger pulse applied to said control grid, and said anode including means for trapping and retaining plasma generated during said forward conduction and thereby permitting reverse conduction of the thyratron due entirely to the trapped and retained plasma when said voltage reversal occurs.

6. A laser arrangement as defined in claim 5 wherein said means for trapping and retaining plasma comprises a reentrant chamber formed by said anode.

* * * * *